(12) United States Patent
Lin

(10) Patent No.: US 10,626,904 B2
(45) Date of Patent: Apr. 21, 2020

(54) ALUMINUM-EXTRUDED FRAME CURVE MODULE STRUCTURE

(71) Applicant: Ruei-Hsing Lin, New Taipei (TW)

(72) Inventor: Ruei-Hsing Lin, New Taipei (TW)

( * ) Notice: Subject to any disclaimer, the term of this patent is extended or adjusted under 35 U.S.C. 154(b) by 371 days.

(21) Appl. No.: 15/807,579

(22) Filed: Nov. 9, 2017

(65) Prior Publication Data

US 2019/0136890 A1    May 9, 2019

(51) Int. Cl.
    *F16B 7/18*    (2006.01)

(52) U.S. Cl.
    CPC .................................... *F16B 7/185* (2013.01)

(58) Field of Classification Search
    CPC ........ E04B 1/40; E04B 1/5806; F16B 5/0052; F16B 7/185; F16B 7/025; F16B 7/0473; F16B 2/125
    See application file for complete search history.

(56) References Cited

U.S. PATENT DOCUMENTS

| 3,816,011 | A | * | 6/1974 | Biebuyck | E06B 3/9636 |
| | | | | | 403/187 |
| 4,572,694 | A | * | 2/1986 | Hoeksema | E04B 2/766 |
| | | | | | 403/187 |
| 5,647,682 | A | * | 7/1997 | Riehm | F16B 7/0473 |
| | | | | | 403/297 |
| 2011/0176860 | A1 | * | 7/2011 | Lin | F16B 7/025 |
| | | | | | 403/119 |
| 2012/0009008 | A1 | * | 1/2012 | Hodoya | B23K 31/022 |
| | | | | | 403/188 |

* cited by examiner

*Primary Examiner* — Daniel J Wiley
(74) *Attorney, Agent, or Firm* — Leong C. Lei

(57) ABSTRACT

An aluminum-extruded frame curve module structure includes at least one coupler and at least one curved board. The coupler includes a connection bar and a connection block connected thereto. A side of the connection block that is not connected with the connection bar is provided with a first fitting section. The curved board has a side that is provided with a second fitting section and an opposite side that is provided with a third fitting section. The second and third fitting sections are selectively connected with the first fitting section of the coupler. In this way, the connection bar of the coupler is connectable with an aluminum-extruded plate and the connection block of the coupler is connectable with the curved board. Two aluminum-extruded plates can be jointed to each other with more than one curved board therebetween to provide a curved form at a desired angle for extension and assembly.

8 Claims, 7 Drawing Sheets

ALUMINUM-EXTRUDED FRAME CURVE MODULE STRUCTURE

TECHNICAL FIELD OF THE INVENTION

The present invention generally relates to an aluminum-extruded frame curve module structure, in which, particularly to a connection bar of a coupler is connectable with the aluminum-extruded plate and a connection block of the coupler is connectable with a curved board such that with the curved board comprises a curved configuration having a predetermined curve angle (such as 15 degrees), multiple ones of such a curved board are connectable to each other to form a curved structure having a desired angle and two aluminum-extruded plates can be jointed to each other with at least one of the curved board coupled therebetween to allow for formation of a curved arrangement involving the aluminum-extruded plate having a desired curving angle for extension and assembly.

DESCRIPTION OF THE PRIOR ART

Frames or racks that are made up of multiple aluminum-extruded frame parts are commonly known and widely used. Examples include, but not limited to, division frames that are commonly built in an exhibition hall, exhibition racks that are commonly used for displaying articles and objects, wall-mounted frames that are commonly used for carrying and supporting articles and objects, partition frames that are commonly used to separate individual office desks, and even frames that are used to support and fix aluminum windows and doors.

Those aluminum-extruded frame parts are provided and used in various forms of combination involving jointing between parts in various ways, such as horizontal joint, vertical joint, T-shaped joint, cross joint, and the likes. Generally, an aluminum-extruded frame part is formed with multiple grooves, each having two opposite sidewalls each having an inwardly-extending flange formed on a top end thereof With such a structure, to joint aluminum-extruded frame parts, a connection plate is partly inserted into the aluminum-extruded frame parts to be jointed. Two ends of the connection plate are each provided with multiple mounting holes. Screws are screwed into the mounting holes of the connection plate. The screws is screwed into the mounting holes such that the connection plate is caused to move relative to the grooves of the aluminum-extruded frame parts to bring the connection plate into tight abutting engagement with the sidewalls of the grooves to fix and prevent the aluminum-extruded frame parts from separating therefrom. This completes the jointing connection between the aluminum-extruded frame parts.

Such a process of jointing, when applied to an actual operation, require the screws to be screwed into the connection plate by consuming a large amount of time and labor in assembling and disassembling. This makes it not possible to achieve a fast and easy operation for installation or construction. In addition, the operation of assembling or disassembling requires tools for the screwing operation, such as screwdrivers, in order to properly proceed with the assembling or disassembling operation. In addition, due to the screws being screwed into the connection plate, wear and abrasion, and thus damage, of a surface structure of the aluminum-extruded frame parts often occur and this may eventually lead to undesired or unexpected corrosion of the surface. Further, disassembling a frame made up of aluminum-extruded frame parts that are jointed with connection plates often results in non-repeated use of the connection plates. And, the consumption and eventual disposal of such connection plates causes an economic burden of increased cost.

Further, the conventional aluminum-extruded frame parts can only be used to provide a fixed angle structure, such as an L-shape, a T-shape or a cross, and this limits the application thereof Considering the need for structural arrangements that match the surrounding environment and for better appearance, the fixed-angle structures may not suit the need of the modern world.

To make an aluminum-extruded frame to suit the need for a curved structural arrangement, aluminum-extruded frame parts must be customized parts or pre-fabricated parts. This certainly increases the cost. In addition, the customized or pre-fabricated parts may not just suit the need for "omnidirectional" curving arrangement of an aluminum-extruded frame. Thus, making the conventional aluminum-extruded parts connectable together at a curved angle to particularly provide the capability of high degree of flexibility of construction and omnidirectional arrangement to match the surrounding environment is the primary concern that this invention is made for.

SUMMARY OF THE INVENTION

The primary objective of the present invention is to provide an aluminum-extruded frame curve module structure for jointing at least one aluminum-extruded plate and comprising: at least one coupler and at least one curved board. The coupler comprises a connection bar and a connection block. The connection bar has one end that is connected, in sequence along an axis, with a stein and a push beam, such that the stein and the push beam are rotatable upward and downward relative to the connection bar. The connection bar has an opposite end that is connected to the connection block. The connection block is provided, on a side thereof connected to the connection bar, with two positioning pegs. The connection block is provided, on a side thereof that is not connected to the connection bar, with at least one first fitting section. The curved board has one side that is provided with at least one second fitting section and an opposite side that is provided with at least one third fitting section. The second fitting section and the third fitting section are selectively connectable with the first fitting section of the coupler. The curved board comprises a curve of a predetermined angle (such as a curve angle of 15 degrees).

A technical feature of the present invention is that the aluminum-extruded plate is formed, in a recessed form, with a first positioning groove and a second positioning groove being formed in each of two sides of the first positioning groove. The stein and the push beam of the connection bar of the coupler are fit into and received in the first positioning groove of the aluminum-extruded plate and the two positioning pegs of the coupler are respectively received in the two second positioning grooves of the aluminum-extruded plate so that the coupler and the aluminum-extruded plate are coupled to each other, achieving fast connection of the coupler to the aluminum-extruded plate in a manner of being free of screws or other fasteners. The first fitting section of the coupler may then coupled to the second fitting section or the third fitting section of the curved board such that with the configuration that the curved board forms a curve of a predetermined angle (such as a curved section of 15 degrees), multiple ones of the curved board may be coupled, in sequence, to each other to form a curved structure of a desired angle of curve (which is of a value incremented or decremented at a multiplicity of 15 degrees). In such a way, the two aluminum-extruded plates are jointed to each other with at least one coupler and curved board coupled therebetween to allow for any desired angle of curve to be formed with the aluminum-extruded plates with high degree of flexibility for extension and assembly.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
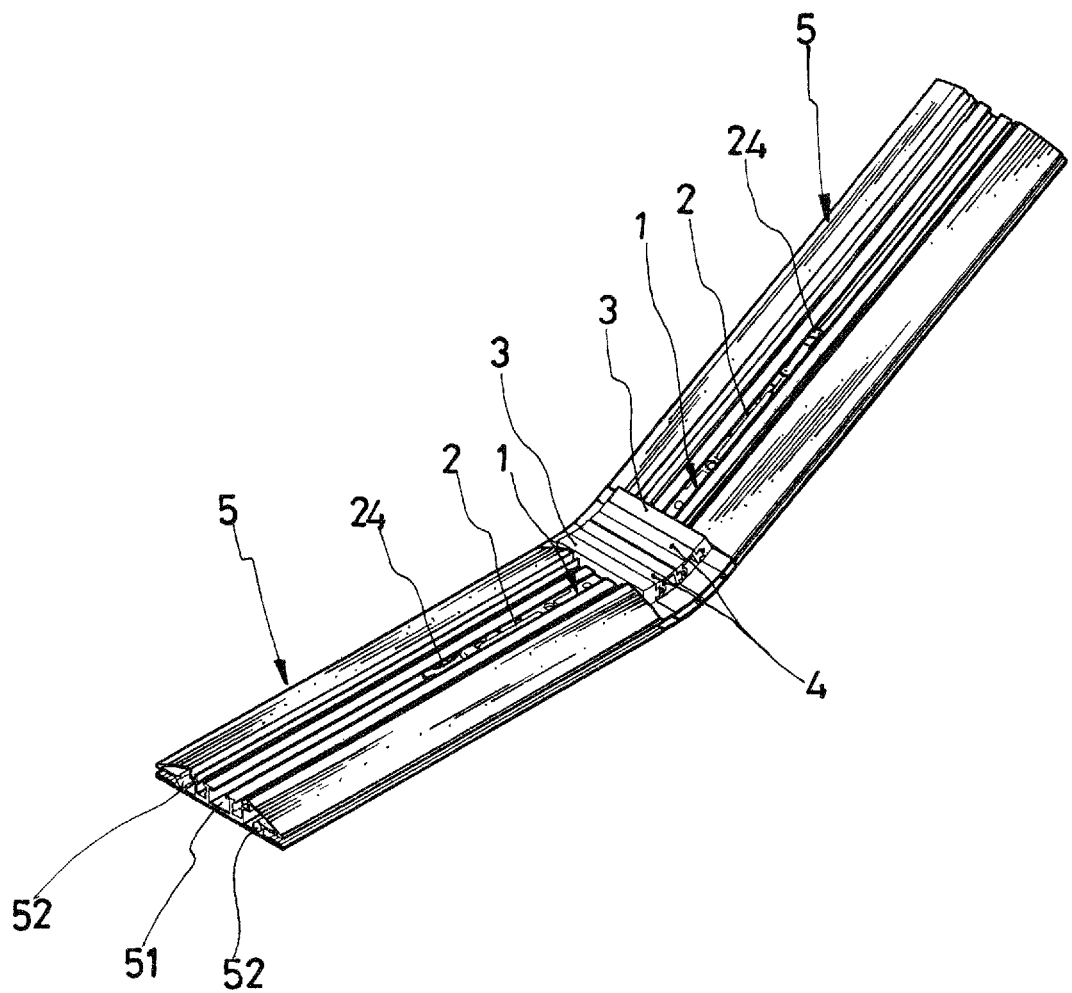
FIG. 1 is a perspective view showing an aluminum-extruded frame curve module structure of the present invention in an assembled form.
Figure 2:
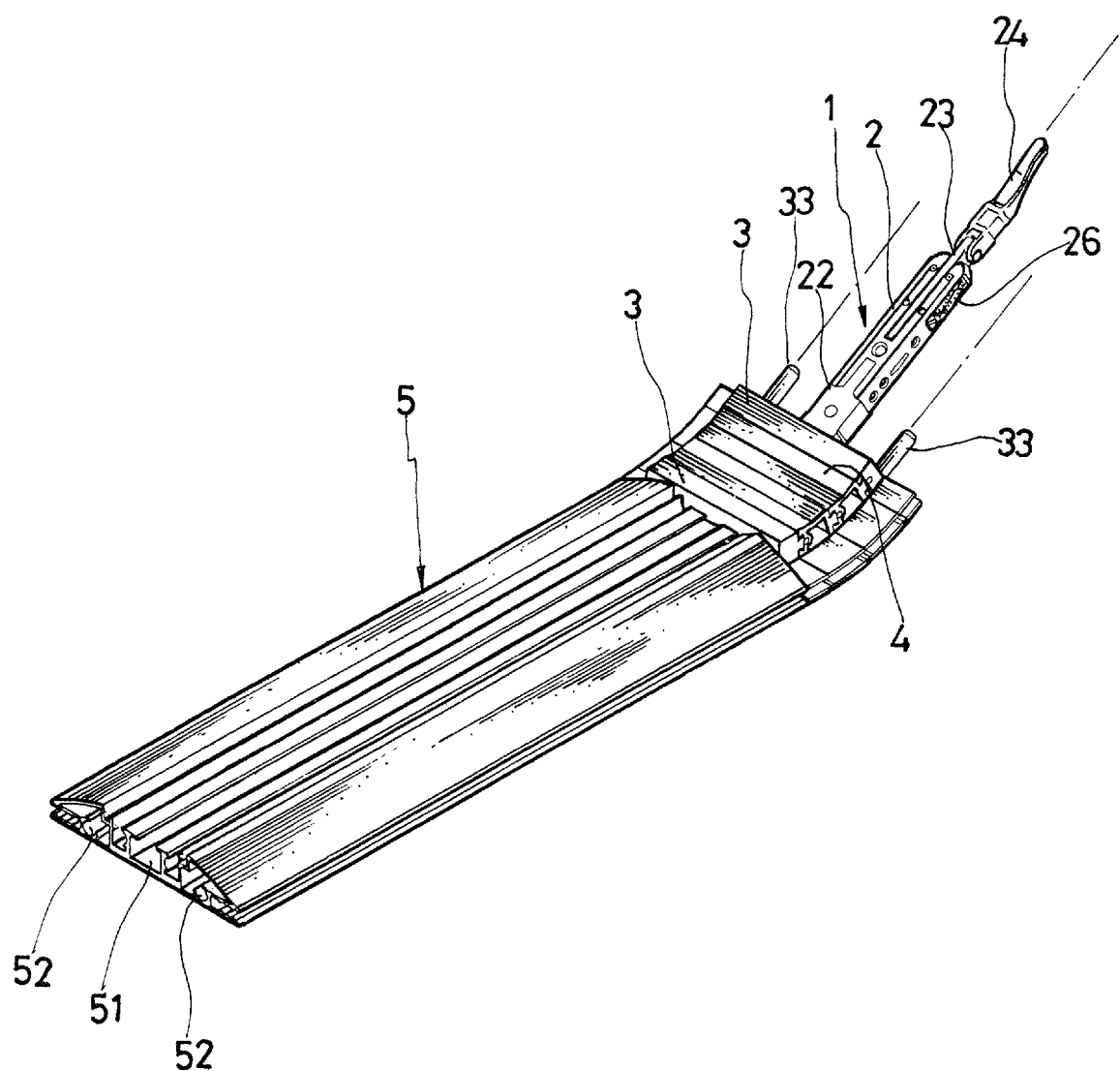
FIG. 2 is a perspective view illustrating an example of embodying the aluminum-extruded frame curve module structure of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-7, the present invention discloses an aluminum-extruded frame curve module structure, which is structure for jointing at least one aluminum-extruded plate 5. The aluminum-extruded plate 5 is formed, in a recessed form, with a first positioning groove 51 and a second positioning groove 52 on each of two opposite sides of the first positioning groove 51. The aluminum-extruded frame curve module structure of the present invention comprises at least one coupler 1 and at least one curved board 4.

Figure 3:
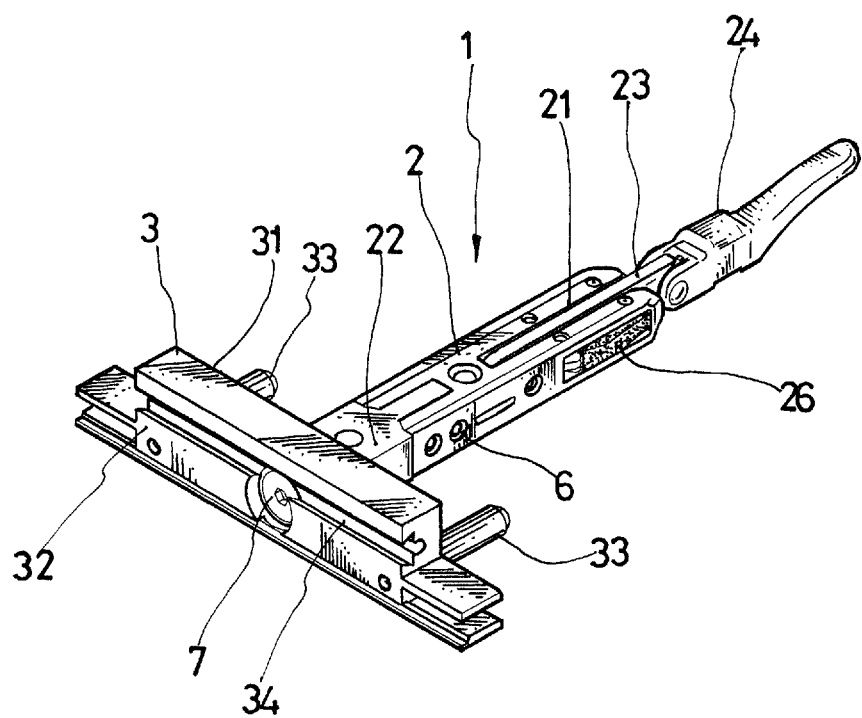
FIG. 3 is a perspective view illustrating a coupler of aluminum-extruded frame curve module structure of the present invention.
Figure 4:
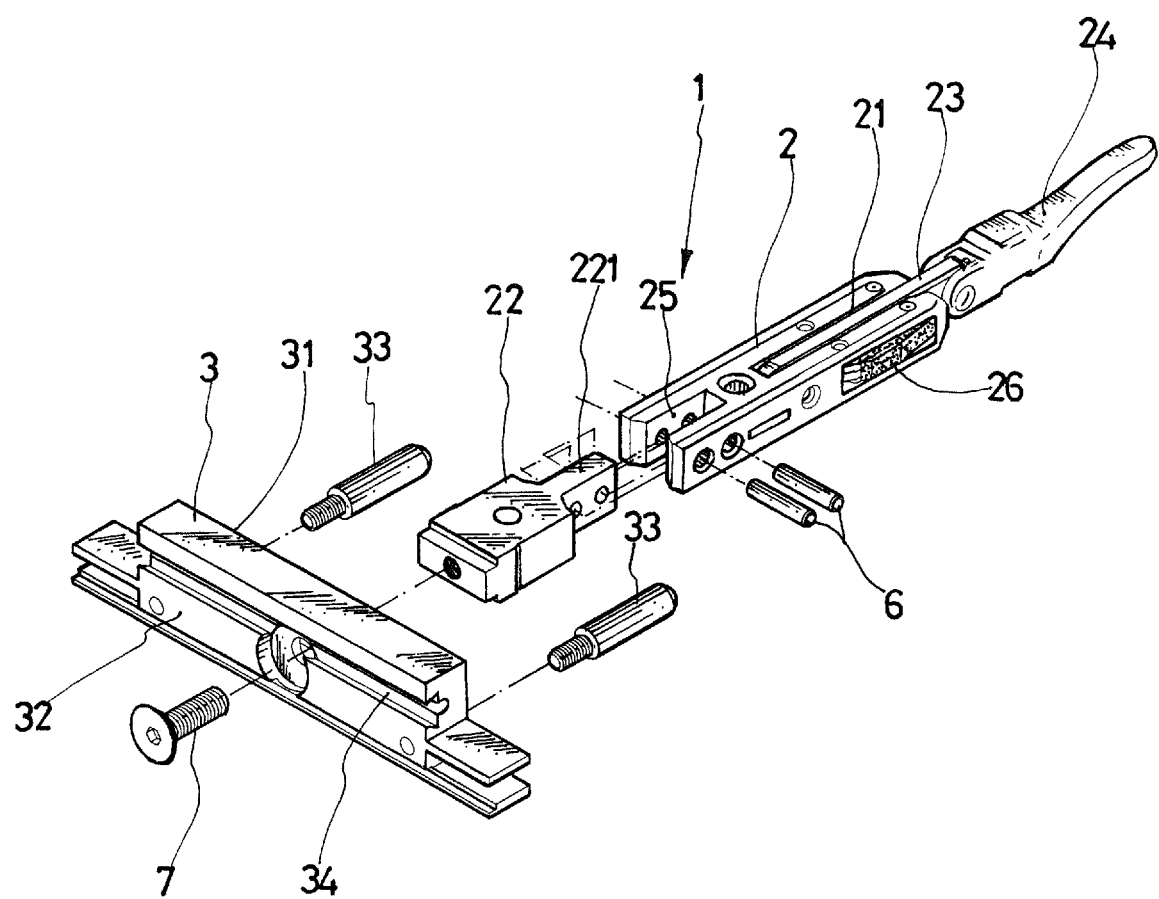
FIG. 4 is an exploded view illustrating the coupler of the aluminum-extruded frame curve module structure of the present invention.
Figure 5:
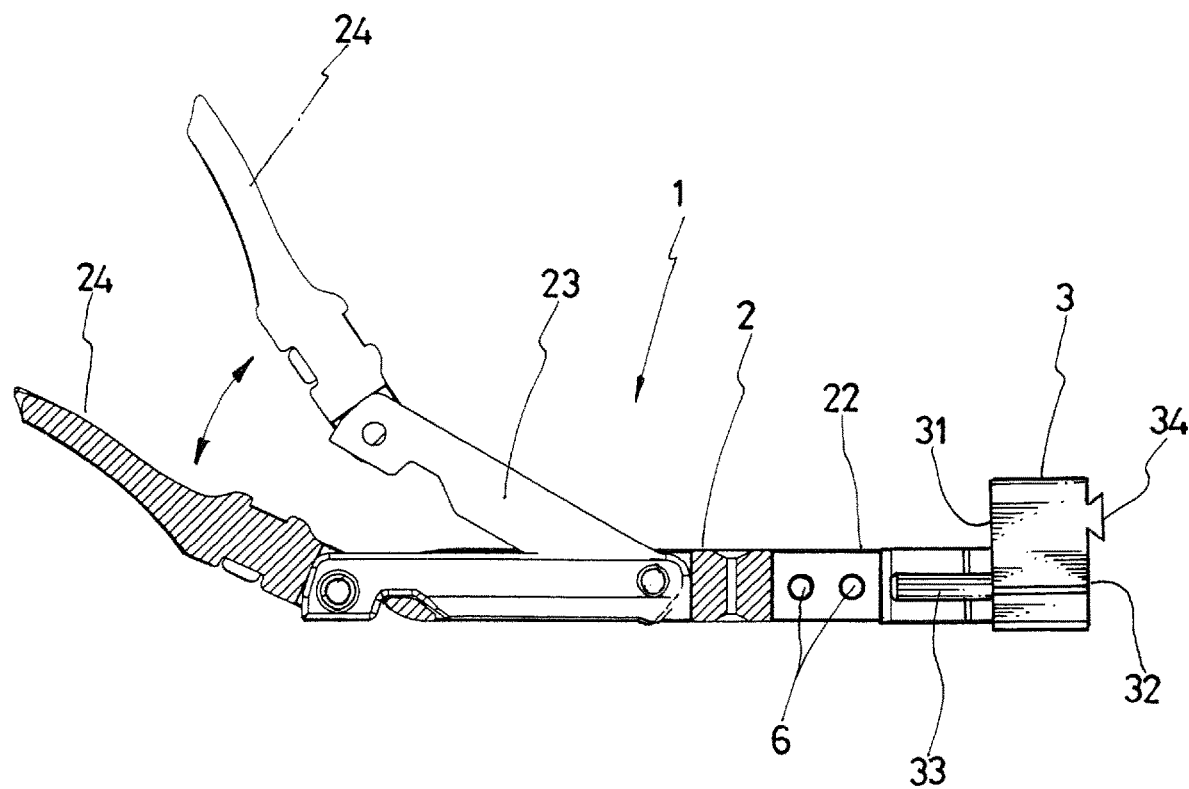
FIG. 5 is a schematic view illustrating the coupler of the aluminum-extruded frame curve module structure of the present invention in a locked condition.

The coupler 1 comprises a connection bar 2 and a connection block 3 (as shown in FIGS. 3 and 4). The connection bar 2 has one end that is connected, in sequence along an axis, with a stein 23 and a push beam 24 and an opposite end that is fixedly connected to a first joint element 22. For example, the connection bar 2 is formed, in the one end thereof, with an open slot 21, and the stein 23 has one end received in the open slot 21 and is connected, along the axis, to the connection bar 2; and the stein 23 has an opposite end that projects outside the open slot 21 and is connected, along the axis, to the push beam 24 so that the stein 23 and the push beam 24 are allow to rotate (turn) in upward and downward directions relative to the connection bar 2 (as shown in FIG. 5). The first joint element 22 and the connection bar 2 can be integrally formed together as a unitary structure, or alternatively, the first joint element 22 and the connection bar 2 are fixedly coupled to each other, wherein the first joint element 22 has an end portion that is formed as a first jointing end 221 and said opposite end of the connection bar 2 that is not connected with the stein 23 is formed as a second jointing end 25, wherein the second jointing end 25 of the connection bar 2 and the first jointing end 221 of the first joint element 22 are fixedly connected to each other by means of at least one first fastening member 6. The connection bar 2 is provided, on each of two opposite lateral sides, with a pressing block 26. The connection block 3 is connected to the connection bar 2 and the connection block 3 is provided, on one side thereof, with a first connection surface 31 and is also provided, on an opposite side thereof, with a second connection surface 32. The first joint element 22 is connected to the first connection surface 31 of the connection block 3 and mutual fixed connection therebetween is achieved by means of at least one second fastening member 7. The connection block 3 is provided, on the first connection surface 31 at each of two side portions thereof with respect to the first joint element 22, with a positioning peg 33, and the two positioning pegs 33 are set in the same extension direction as the connection bar 2. Further, the connection block 3 is provided, in the second connection surface 32 thereof, with at least one first fitting section 34, wherein the first fitting section 34 is in a form of a recess (such as in the form of a dovetail groove), or alternatively, as shown in FIG. 6, the first fitting section 34 can be in the form of a raised block (such as in the form of a dovetail block).

The curved board 4 is structured for connection with the coupler 1. The curved board 4 has a side that is formed with a third connection surface 41 and an opposite side that is formed with a fourth connection surface 42. The curved board 4 is provided, on the third connection surface 41, with at least one second fitting section 43, and the curved board 4 is provided, on the fourth connection surface 42, with at least one third fitting section 44, wherein the second fitting section 43 can be in the form of a block having a dovetail configuration and the third fitting section 44 can be in the form of a dovetail groove. Further, the curved board 4 is curved with an angle, and for example, the curved board 4 has a curve at an angle of 15 degrees.

Figure 7:
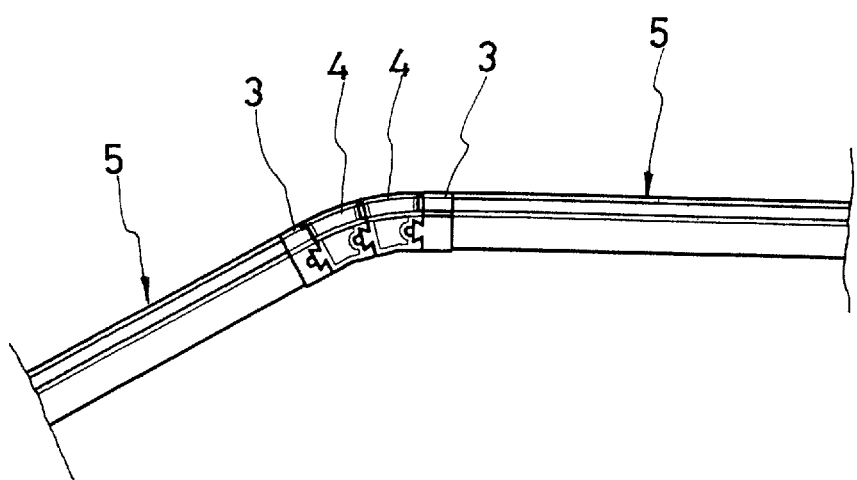
FIG. 7 is a side-elevational view illustrating the aluminum-extruded frame curve module structure of the present invention in an assembled form.

As an example of illustration, the coupler 1 is connected to the aluminum-extruded plate 5 in such a way that the stein 23 and the push beam 24 of the connection bar 2 of the coupler 1 are received in and fit into the first positioning groove 51 of the aluminum-extruded plate 5 (as shown in FIG. 1), and the pressing blocks 26 that are provided on the connection bar 2 may achieve tight engagement with the first positioning groove 51 for fixing. The two positioning pegs 33 of connection block 3 of the coupler 1 are respectively received into the two second positioning grooves 52 of the aluminum-extruded plate 5 so that the coupler 1 is securely fixed and connected to the aluminum-extruded plate 5. This makes connection of the coupler 1 to the aluminum-extruded plate 5 in a manner of being free of screws or other fasteners. Further, the first fitting section 34 formed on the connection block 3 of the coupler 1 is provided for coupling with the curved board 4 in such a way that the first fitting section 34 of the connection block 3 is set into engagement with and thus coupled to the second fitting section 43 or the third fitting section 44 of the curved board 4. In other words, with the configuration that the curved board 4 forms a curve of a predetermined angle (such as a curved section of 15 degrees), multiple ones of the curved board 4 may be coupled, in sequence, to each other to form a curved structure of a desired angle of curve, and the two aluminum-extruded plate 5 may be coupled to each other with more than two of such coupler 1 and at least one of such curved board 4 connected therebetween. This provides an arrangement that allows for any desired angle of curve to be formed with the aluminum-extruded plate 5 with high degree of flexibility for extension and assembly (as shown in FIG. 7).

Figure 6:
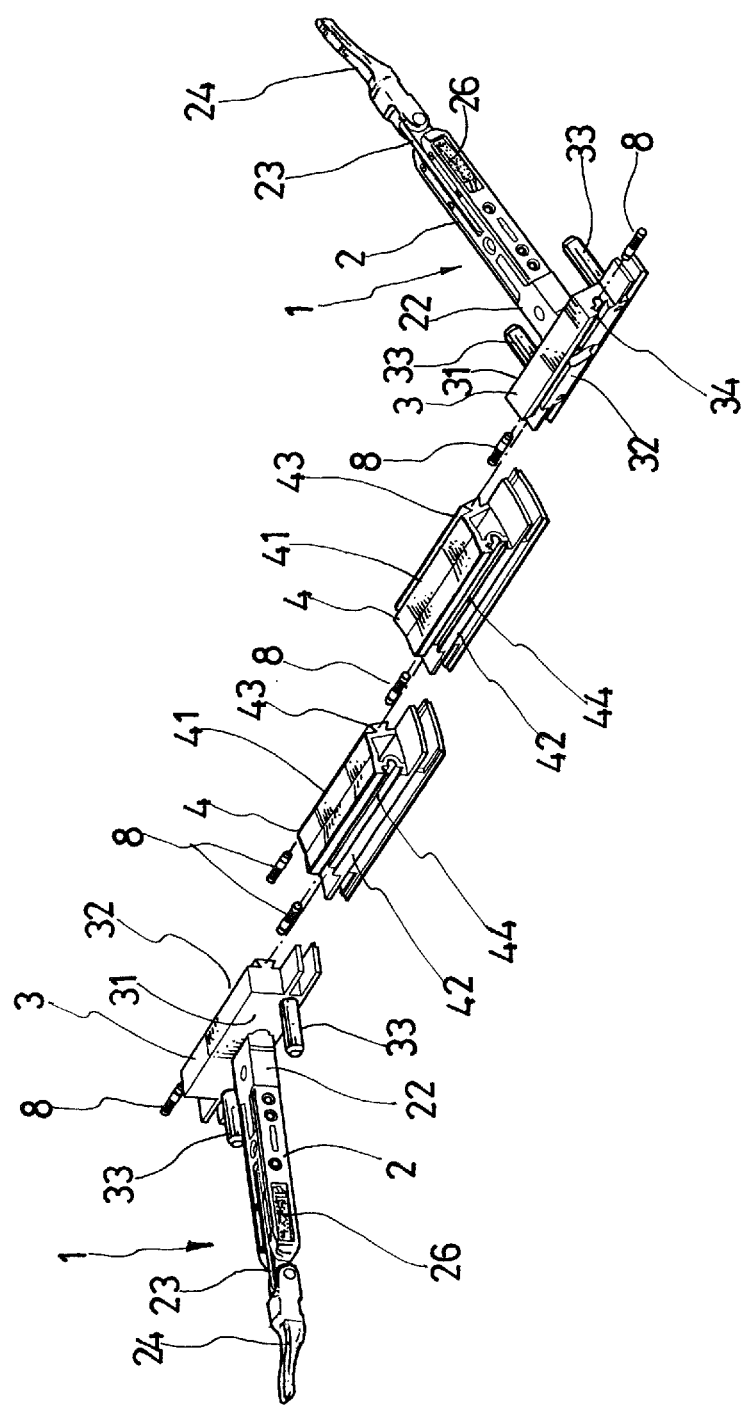
FIG. 6 is an exploded view illustrating the aluminum-extruded frame curve module structure of the present invention.

It is noted (as shown in FIG. 6) the first fitting section 34 of the connection block 3 can be in the form of a recess (such as a dovetail groove) or a raised block (such as a dovetail block). When the first fitting section 34 of the connection block 3 is coupled to the second fitting section 43 of the curved board 4, since the second fitting section 43 is in the form of a dovetailed block, the first fitting section 34 of the connection block 3 is set in the form of a recess (such as a dovetail groove) to allow the first fitting section 34 of the connection block 3 and the second fitting section 43 of the curved board 4 to engage with and fit to each other for secure coupling therebetween; oppositely, when the first fitting section 34 of the connection block 3 is coupled to the third fitting section 44 of the curved board 4, since the third fitting section 44 is in the form of a dovetail groove, the first fitting section 34 of the connection block 3 is made in the form of a raised block (such as a dovetail block) to allow the first fitting section 34 of the connection block 3 and the third fitting section 44 of the curved board 4 to engage with and fit to each other for secure coupling therebetween. In addition, the second fitting section 43 of the curved board 4 may be selectively engage with and fit to the third fitting section 44 of another curved board 4 to allow multiple curved boards 4 to be sequentially connected to each other to form a curved structure of a desired angle.

When the first fitting section 34 of the connection block 3 and the second fitting section 43 of the curved board 4 are coupled to each other, a third fastening member 8 may be inserted into a void space in each of two external sides of the first fitting section 34 and the second fitting section 43 to prevent the first fitting section 34 and the second fitting section 43 from separating from each other; and when the first fitting section 34 of the connection block 3 and the third fitting section 44 of the curved board 4 are coupled to each other, a third fastening member 8 may be inserted into a void space in each of two external sides of the first fitting section 34 and the third fitting section 44 to prevent the first fitting section 34 and the third fitting section 44 from separating from each other; and when the second fitting section 43 of the curved board 4 and the third fitting section 44 of another curved board 4 are coupled to each other, a third fastening member 8 may be inserted into a void space in each of two external sides of the second fitting section 43 and the third fitting section 44 to prevent the second fitting section 43 and the third fitting section 44 from separating from each other.

Based on the above-described structural arrangement, two aluminum-extruded plate 5 can be jointed to each other by means of at least one coupler 1 and curved board 4 coupled therebetween. This provides an arrangement that allows for any desired angle of curve to be formed with the aluminum-extruded plates 5 with high degree of flexibility for extension and assembly.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An aluminum-extruded frame curve module structure for jointing at least one aluminum-extruded plate, wherein the aluminum-extruded frame curve module structure comprises:

at least one coupler, which comprises:
a connection bar, which has one end that is connected, in sequence along an axis, with a stein and a push beam and an opposite end that is connected to a first joint element such that the stein and the push beam are rotatable upward and downward relative to the connection bar, and
a connection block, which is connected to the connection bar, wherein the connection block is provided, on one side thereof, with a first connection surface and is also provided, on an opposite side thereof, with a second connection surface, the first connection surface being connectable to the first joint element of the connection bar, the first connection surface being provided, on each of two side portions thereof with respect to the first joint element, with a positioning peg, such that the two positioning pegs are set in an extension direction that is identical to an extension direction of the connection bar, the second connection surface being provided with at least one first fitting section; and
at least one curved board, which is connectable to the coupler, wherein the curved board has a side that is formed with a third connection surface and an opposite side that is formed with a fourth connection surface, the third connection surface being provided with at least one second fitting section, the fourth connection surface being provided with at least one third fitting section, the second fitting section and the third fitting section being selectively connectable to the first fitting section of the coupler;
wherein the aluminum-extruded plate is formed with a first positioning groove and a second positioning groove on each of two opposite sides of the first positioning groove, the stein and the push beam of the connection bar of the coupler being fit into and received in the first positioning groove, the two positioning pegs of the coupler being respectively received in the two second positioning grooves so that the coupler and the aluminum-extruded plate are coupled to each other, wherein the first fitting section of the coupler is engageable with and thus coupled to one of the second fitting section and the third fitting section of the curved board to couple the curved board and the coupler to each other.

2. The aluminum-extruded frame curve module structure as claimed in claim 1, wherein for the first fitting section of the connection block being coupled to the second fitting section of the curved board, the first fitting section is made in the form of a dovetail groove and the second fitting section is made in the form of a dovetail block so that the first fitting section and the second fitting section are mutually fit to and fixed to each other.

3. The aluminum-extruded frame curve module structure as claimed in claim 2, wherein a third fastening member is inserted into each of two external sides of the first fitting section and the second fitting section.

4. The aluminum-extruded frame curve module structure as claimed in claim 1, wherein for the first fitting section of the connection block being coupled to the third fitting section of the curved board, the first fitting section is made in the form of a dovetail block and the third fitting section is made in the form of a dovetail groove so that the first fitting section and the third fitting section are mutually fit to and fixed to each other.

5. The aluminum-extruded frame curve module structure as claimed in claim 4, wherein a third fastening member is inserted into each of two external sides of the first fitting section and the third fitting section.

6. The aluminum-extruded frame curve module structure as claimed in claim 1, wherein the second fitting section of the curved board is connectable with a third fitting section of an additional curved board such that the curved boards are connected in sequence to form a curve of a predetermined angle.

7. The aluminum-extruded frame curve module structure as claimed in claim 6, wherein a third fastening member is inserted into each of two external sides of the second fitting section of the curved board and the third fitting section of the additional curved board.

8. The aluminum-extruded frame curve module structure as claimed in claim 1, wherein the curved board comprises a curve having a predetermined angle.

* * * * *